Figure 1:
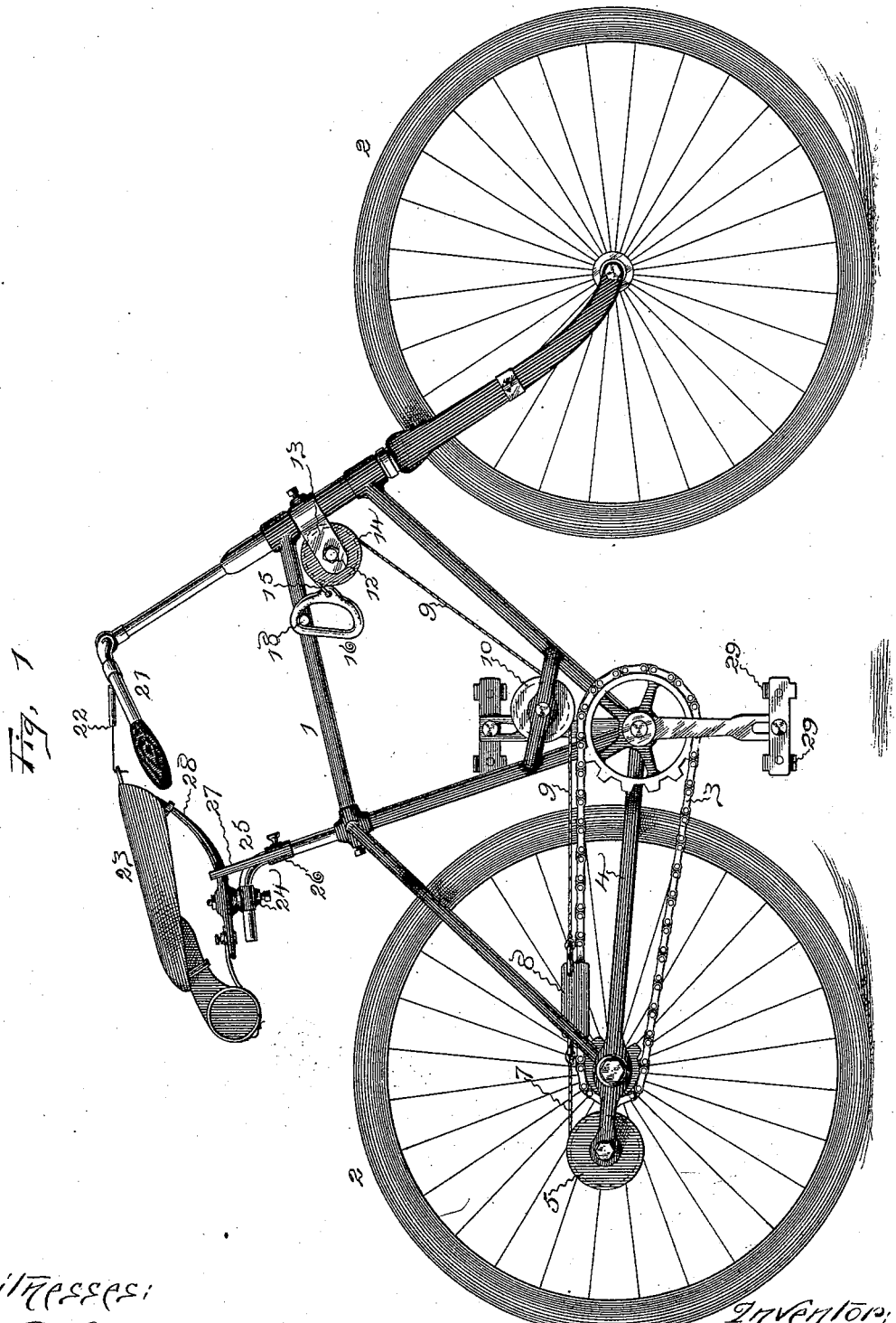

(No Model.)  2 Sheets—Sheet 1.
R. J. GATLING.
BICYCLE.

No. 519,384.  Patented May 8, 1894.

Witnesses:
C. E. Buckland,
Arthur P. Day

Inventor:
Richard J. Gatling, by
Harry R. Williams
atty.

(No Model.) 2 Sheets—Sheet 2.
R. J. GATLING.
BICYCLE.
No. 519,384. Patented May 8, 1894.
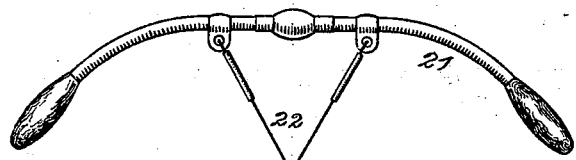
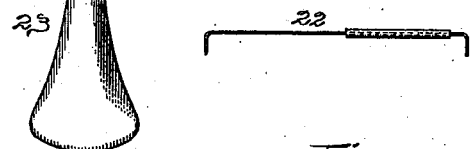
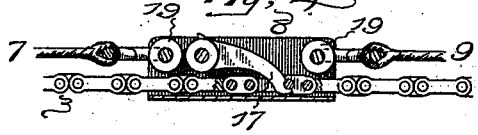
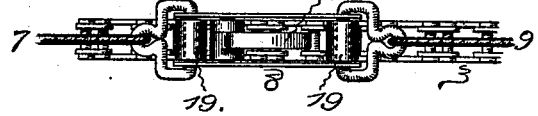
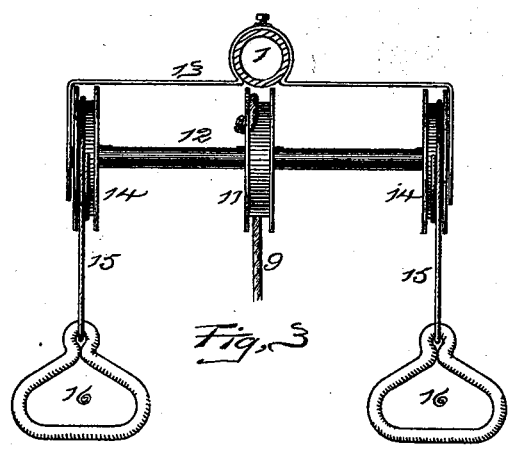
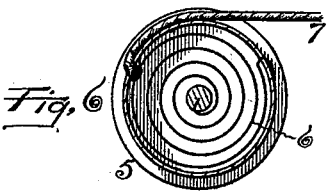
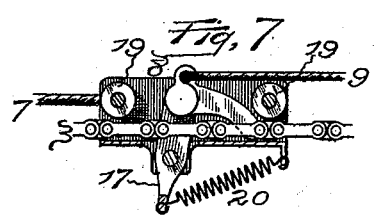
Witnesses:
C. E. Buckland.
Arthur P. Day.
Inventor:
Richard J. Gatling,
by Harry R. Williams
atty
THE NATIONAL LITHOGRAPHING COMPANY,
WASHINGTON, D. C.

UNITED STATES PATENT OFFICE.

RICHARD J. GATLING, OF HARTFORD, CONNECTICUT.

BICYCLE.

SPECIFICATION forming part of Letters Patent No. 519,384, dated May 8, 1894.

Application filed November 5, 1892. Serial No. 451,032. (No model.)

*To all whom it may concern:*

Be it known that I, RICHARD J. GATLING, a citizen of the United States, residing at Hartford, in the county of Hartford and State of Connecticut, have invented certain new and useful Improvements in Bicycles, of which the following is a full, clear, and exact specification.

The invention relates to the class of safety bicycles, the object being to construct a vehicle of this class which may be propelled by either or both the hands or feet so that when used for exercise many different muscles may be brought into action and when used for racing additional speed may be obtained by the employment of all the arm and leg muscles.

Referring to the accompanying drawings:—Figure 1 is a side elevation of a bicycle embodying the improvements. Fig. 2 shows a detail plan of the handle bar, seat and connections. Fig. 3 is a plan of the hand pulls and drums. Fig. 4 is a side view of a portion of the driving chain showing in section the pawl slide. Fig. 5 is a plan of the same. Fig. 6 is a sectional view showing the spring barrel for drawing back the pawl slide. Fig. 7 is a view of a modified form of pawl slide. Fig. 8 shows views of the seat locking device.

In the views 1 indicates the tubular frame, 2 the wheels, and 3 the sprocket chain that passes from the pedal sprocket to the rear wheel sprocket of a safety bicycle of ordinary form. The lower bar 4 of the frame on the side of the sprocket is extended to the rear, and upon a stud projecting from this extension is pivoted a drum 5 in which is coiled a spring 6 having one end fastened to the stud and the other to the drum. One end of a strap or cord 7 is fastened to the periphery of this drum, while the other end is fastened to a bail secured to a slide 8 that travels along the sprocket chain. To another bail on this slide is fastened a cord 9 that leads around a pulley 10 pivoted to the frame, to a drum 11 on shaft 12 journaled in a yoke 13 secured to the front part of the frame of the machine. On this shaft are secured drums 14 to which cords 15 having handles 16 are so attached that when pulled they unwind from their drums and cause the drum 11 to wind up the cord 9. The slide 8 is preferably formed of a rectangular piece of metal and between its walls is a pivoted pawl 17 adapted to engage the links of the sprocket chain. When either or both of the handles 16 are lifted from the lugs 18 and drawn toward the rider the drums wind up the cord 9 and pull forward the slide with its pawl in engagement with the links in such manner as to drive the machine, and when the handles are released the spring-drum 5 winds up the cord 7 which draws the slide with its pawl again to the rear. Rollers 19 may be hung between the walls of the slide to facilitate its motion, and as shown in Fig. 7 a spring 20 may be provided to normally hold the pawl from the chain, in which case the cord 9 may be attached to the pawl, so that when pulled it will cause the pawl to engage the links. When both of the hands are occupied with the pulling apparatus the handle bar 21 is connected by means of one or more cords or rods 22 with a loop on the seat 23 of ordinary construction which is pivoted to the sleeve 24 that is adjustably secured to the seat-post of the frame, in such manner that the machine may be steered by the movement of the body of the rider on the seat. The rods 22 are made adjustable to permit an adjustment of the seat, and if desired of course they may be made to hook into a belt strapped about the rider for steering in the manner described, when the hands are both in use.

A lock 25 is provided for securing the seat in position during mounting and when the machine is to be steered by hand. This lock in the form shown consists of a tube 26 adapted to slide upon the seat post having a fork 27 to engage the spring 28 of the seat and hold it in position when the lock is drawn upward.

When both the hands and feet are used to propel the machine not only are very many muscles of the body exercised in a healthful manner but great speed derived from the combined power of both the arms and legs.

The machine is simple and cheap in construction, and has but little more mechanism than the common safety bicycle. It can be used for racing purposes, as by supplementing the legs by the use of the arms additional speed can be obtained, and it can be used simply for exercise, as the hand pulls tend to develop the arm and chest muscles as well as the legs and trunk muscles.

I claim as my invention—

1. In combination with the wheel supported frame of a bicycle, a pedal shaft with the sprocket wheel supported by the frame between the wheels, a sprocket chain passing around the sprocket wheel on the pedal shaft and a sprocket wheel on the shaft of the rear wheel, a slide movable along the sprocket chain, said slide bearing a pawl that engages with the links of the chain, a cord connected with one end of the slide and provided with handles for drawing the slide in one direction, and a cord attached to the other end of the slide and connected with a spring actuated drum supported by the frame back of the rear axle, for moving the slide in the opposite direction, substantially as specified.

2. In combination with the wheel supported frame of a bicycle, a pedal shaft with the sprocket wheel supported by the frame, a sprocket chain passing around the sprocket wheel on the pedal shaft and a sprocket wheel on the shaft of the driving wheel, a slide movable along the chain, a pawl pivoted to the slide and adapted to engage with the chain, a cord secured to one end of said pawl for pulling it in one direction, a spring connected with the other end of the pawl for pulling it in the opposite direction, and a cord connecting the slide with a spring actuated drum, substantially as specified.

3. In combination with the wheel supported frame of a bicycle, a pedal shaft with a sprocket wheel supported by the frame, a sprocket chain passing around the sprocket wheel on the pedal shaft and a sprocket wheel on the shaft of the driving wheel, a slide provided with a spring actuated pawl movable along the chain, a cord connected with the slide passing over drums on the frame, one of said drums being borne by a shaft bearing drums connected with the handle cords, and a spring actuated drum connected with the movable slide, substantially as specified.

4. In combination with a wheel supported frame of a bicycle, a pedal shaft with a sprocket wheel supported by the frame, a sprocket chain passing around the sprocket wheel on the pedal shaft and a sprocket wheel on the shaft of the driving wheel, a slide movable along the chain, a pawl pivoted to the slide and adapted to engage the chain, a cord connected with handles secured to one end of said pawl for pulling it and the slide in one direction, and a spring connected with the other end of the pawl for pulling it in the opposite direction, substantially as specified.

5. In a foot and hand propelled bicycle in combination with the frame, a horizontally oscillating seat loosely held by a vertical pivot in the axis of the seat to a sleeve below the center of the seat, said sleeve being horizontally adjustable on a vertically adjustable bar supported by the frame, a non-elastic rigid connection removably attached to the horn of the horizontally movable seat in front of the axis of its support, said non-elastic connections also being removably attached to the handle bar on each side of its pivotal axis, substantially as described and for the purpose specified.

RICHARD J. GATLING.

Witnesses:
H. R. WILLIAMS,
C. E. BUCKLAND.